(12) United States Patent
Bassett (10) Patent No.: US 8,146,519 B2
(45) Date of Patent: Apr. 3, 2012

(54) AGRICULTURAL IMPLEMENT FOR DELIVERING MULTIPLE MEDIA TO SOIL

(75) Inventor: Joseph D. Bassett, DeKalb, IL (US)

(73) Assignee: Dawn Equipment Company, Sycamore, IL (US)

( * ) Notice: Subject to any disclaimer, the term of this patent is extended or adjusted under 35 U.S.C. 154(b) by 306 days.

(21) Appl. No.: 12/580,852

(22) Filed: Oct. 16, 2009

(65) Prior Publication Data

US 2010/0154693 A1     Jun. 24, 2010

Related U.S. Application Data

(63) Continuation-in-part of application No. 12/511,314, filed on Jul. 29, 2009, now Pat. No. 7,870,827.

(60) Provisional application No. 61/140,757, filed on Dec. 24, 2008.

(51) Int. Cl.
| A01C 5/00 | (2006.01) |
| A01C 7/00 | (2006.01) |
| A01C 9/00 | (2006.01) |
| A01C 13/00 | (2006.01) |
| A01C 23/00 | (2006.01) |

(52) U.S. Cl. ........ 111/119; 111/121; 111/129; 111/163; 111/174; 111/195

(58) Field of Classification Search .......... 111/118–121, 111/127, 129, 149, 157, 163–196
See application file for complete search history.

(56) References Cited

U.S. PATENT DOCUMENTS

| 4,407,660 | A | * | 10/1983 | Nevens et al. | 604/6.04 |
| 4,682,550 | A | * | 7/1987 | Joy | 111/7.1 |
| 5,852,982 | A | | 12/1998 | Peter | 111/118 |
| 6,067,918 | A | | 5/2000 | Kirby | 111/121 |
| 6,453,832 | B1 | | 9/2002 | Schaffert | 111/150 |
| 6,997,400 | B1 | | 2/2006 | Hanna et al. | 239/383 |
| 7,004,090 | B2 | | 2/2006 | Swanson | 111/119 |
| 7,290,491 | B2 | | 11/2007 | Summach et al. | 111/181 |
| 7,523,709 | B1 | | 4/2009 | Kiest | 111/119 |
| 2006/0102058 | A1 | | 5/2006 | Swanson | 111/119 |
| 2006/0213566 | A1 | * | 9/2006 | Johnson | 138/111 |
| 2007/0044694 | A1 | | 3/2007 | Martin | 111/121 |

FOREIGN PATENT DOCUMENTS

JP          2008162241 A  *  7/2008

* cited by examiner

*Primary Examiner* — Christopher J. Novosad
(74) *Attorney, Agent, or Firm* — Nixon Peabody LLP (57) ABSTRACT

An agricultural implement is directed to delivering multiple fluids to the soil of an agricultural field. The implement includes a frame for carrying a soil cutting device and a closing device. The cutting device forms a furrow in the soil and the closing device, which trails the cutting device, closes the furrow. A fluid delivery tine is mounted on the frame and extends downwardly into the furrow between the cutting device and the closing device. The tine has a pair of coaxial tubes, including an outer tube and an inner tube, wherein the coaxial tubes form an outer passageway between the outer tube and the inner tube for delivering a first fluid toward the furrow. The inner tube has an internal passageway for delivering a second fluid toward the furrow.

20 Claims, 6 Drawing Sheets

AGRICULTURAL IMPLEMENT FOR DELIVERING MULTIPLE MEDIA TO SOIL

CROSS REFERENCE TO RELATED APPLICATIONS

This application is a continuation-in-part application that claims priority to U.S. patent application Ser. No. 12/511,314, filed on Jul. 29, 2009, which claims priority to U.S. Provisional Application No. 61/140,757, filed on Dec. 24, 2008, each of which is hereby incorporated by reference in its entirety.

FIELD OF THE INVENTION

The present invention relates generally to agricultural equipment and, more particularly, to an implement for injecting multiple fluids into the soil in an agricultural field.

BACKGROUND OF THE INVENTION

One of the common forms of fertilizer used in agricultural fields is ammonia gas, which functions as a nitrogen fertilizer when delivered into the soil. Although ammonia gas has been used as an agricultural fertilizer for many years, problems remain in achieving efficient and effective delivery of ammonia gas into soil before the gas escapes to the atmosphere. Problems are also caused by the cooling effect caused by expansion of the ammonia gas as it is discharged into the soil, which causes freezing of soil and moisture on the implement, leading to adverse effects on performance.

In addition to or instead of ammonia gas, other types of products are delivered in agricultural fields. Often, multiple fluids are delivered generally simultaneously (e.g., liquid nitrogen, water, etc.). One problem associated with the delivery of multiple fluids includes chemical hose routings that are often placed in hazardous locations near the area of a cutting blade, where crop residue tends to remain lodged. The placement of current chemical hose routings present safety and performance problems. Another problem is directed to mixing of chemicals, which are typically mixed open to the atmosphere while in the furrow. Chemical reactions are typically accomplished most efficiently in confined areas or containers.

SUMMARY OF THE INVENTION

In accordance with one embodiment, an agricultural implement is directed to delivering multiple fluids to the soil of an agricultural field. The implement includes a frame for carrying a soil cutting device and a closing device. The cutting device forms a furrow in the soil and the closing device, which trails the cutting device, closes the furrow. A fluid delivery tine is mounted on the frame and extends downwardly into the furrow between the cutting device and the closing device. The tine has a pair of coaxial tubes, including an outer tube and an inner tube, wherein the coaxial tubes form an outer passageway between the outer tube and the inner tube for delivering a first fluid toward the furrow. The inner tube has an internal passageway for delivering a second fluid toward the furrow.

In accordance with another embodiment, a method of delivering multiple fluids to the soil of an agricultural field includes forming a furrow in the soil with a towed cutting device, and closing the furrow with a towed closing device trailing the cutting device. A fluid delivery tine is extended downwardly into the furrow between the cutting device and the closing device, the fluid delivery tine having a discharge nozzle coupled at a bottom end positioned in the furrow. Two separate fluids are delivered, via the fluid delivery tine, into a mixing chamber of the discharge nozzle, wherein a first one of the fluids is delivered via an outer passageway of the fluid delivery tine and a second one of the fluids is delivered via an internal passageway of the fluid delivery tine. The internal passageway is coaxial with the outer passageway. The two fluids are mixed in the mixing chamber to form a byproduct, which is expelled toward a bottom wall of the furrow prior to the closing of the furrow.

BRIEF DESCRIPTION OF THE DRAWINGS

The invention may best be understood by reference to the following description taken in conjunction with the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
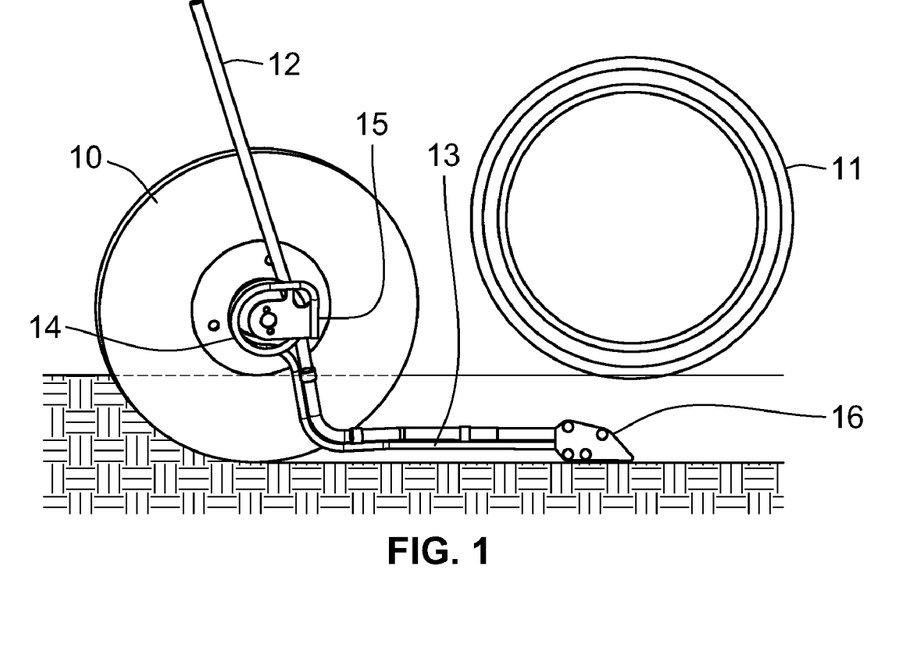
FIG. 1 is a side elevation of a portion of an agricultural planting implement that includes an opener disc, an ammonia delivery tube and a closing wheel.
Figure 2:
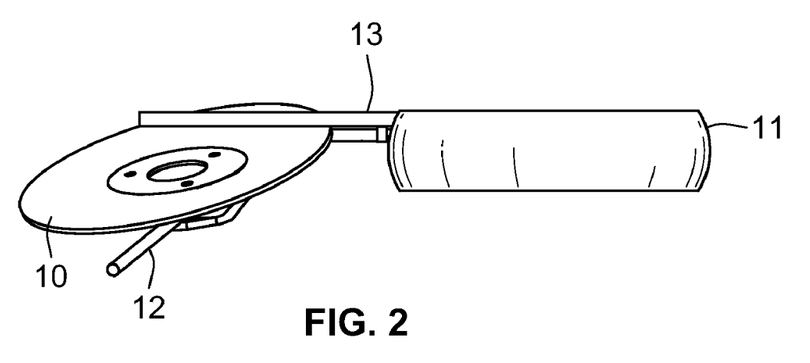
FIG. 2 is a top plan view of the devices shown in FIG. 1.
Figures 3, 4, 5:
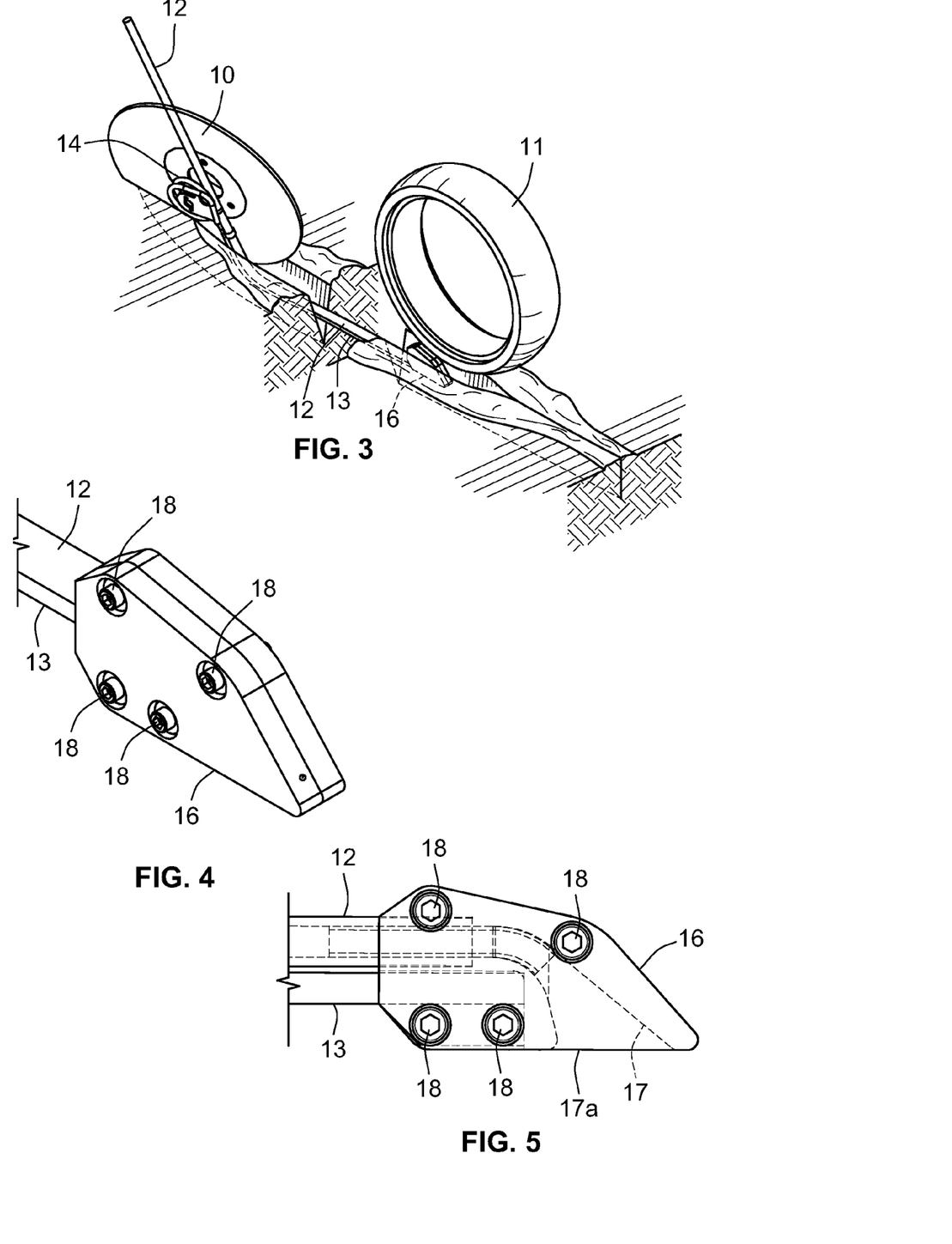
FIG. 3 is a perspective view of the devices shown in FIG. 1.
FIG. 4 is an enlarged perspective view of the diffuser tip on the trailing end of the ammonia delivery tube shown in FIGS. 1-3.
FIG. 5 is a side elevation of the diffuser tip shown in FIG. 4.

Turning now to the drawings and referring first to FIGS. 1-3, the illustrative agricultural cultivating and fertilizing implement includes a cutting device such as an opener disc 10 for forming a furrow for receiving fertilizer, and a closing device such as a closing wheel 11 for closing the furrow after fertilizer has been delivered into the furrow. Those working in the agricultural field sometimes use the term "slot" instead of "furrow." Both the opener disc 10 and the closing wheel 11 are mounted on brackets depending from a conventional frame adapted to be towed by a tractor. A portion of a bracket 15 carrying the opener disc 10 is shown in FIG. 1.

The illustrative opener disc 10 is tilted slightly, as can be seen in FIGS. 1-3, but opener discs that are substantially vertical are also used for cutting furrows in soil. The opener disc 10 may be replaced with a conventional knife opener or "shank," and the closing wheel 11 may be replaced with any of a variety of different closing devices that are well known in the agricultural implement industry. Both fertilizer and seeds may be deposited in the furrow before it is closed, when the implement is used as part of a planting operation, or just fertilizer when the implement is used only for fertilizing or cultivating and fertilizing.

Extending downwardly along one side of the opener disc 10 is an ammonia delivery tube 12 for delivering ammonia gas into the furrow formed by the disc 10. The portion of the delivery tube that extends into the furrow is guided and supported by a tine 13 that extends downwardly from the bracket 15 and then bends rearwardly toward the closing wheel 11, preferably overlapping a portion of the closing wheel so that the ammonia is discharged into the furrow just before, or even just after, the furrow is closed. That is, the delivery tube 12 extends rearwardly along the bottom of the furrow to the closing wheel 11 and delivers ammonia gas onto at least one wall of the furrow in the vicinity of where the furrow is closed by the closing wheel. The tine 13 is preferably spring biased toward the bottom of the furrow by a conventional spring 14 mounted on the bracket 15 in which the axle of the opener disc is journaled. Alternatively, the tine itself may be made resilient so that it can be positioned near the bottom of the furrow with the ability to flex upwardly as required by the soil conditions. Also, the tine and the delivery tube may be integrated in a single part. The tine, or the single integrated part, can be made of either metal or polymeric material.

A discharge nozzle 16 (see FIGS. 4 and 5) is mounted on the trailing end of the ammonia delivery tube 12 for discharging ammonia gas onto at least the bottom of the furrow formed by the opener disc 10. As can be seen in FIG. 5, the discharge nozzle 16 forms an expansion chamber 17 to allow expansion of the ammonia gas just before the gas is discharged from the nozzle 16. This reduces the velocity at which the gas is discharged, thereby improving absorption of the ammonia in the soil by reducing the amount of ammonia that is deflected off the soil and out of the furrow. The exit opening 17*a* of the expansion chamber 17 is on the bottom of the nozzle 16 so that the gas is directed onto the bottom wall of the furrow formed by the opener disc 10. Because the tine 13 is biased downwardly, the nozzle 16 is maintained in engagement with the bottom of the furrow so that it is difficult for the pressurized ammonia gas to escape into the atmosphere rather than penetrating into the soil. The chamber 17 may also be provided with side holes to discharge ammonia gas onto the side walls of the furrow, as well as the bottom wall.

The ammonia gas delivery tube 12 and the discharge nozzle 16 are both preferably made of non-metallic material, such as a polymeric material, so that these components have low thermal conductivity. This is desirable because the expansion of the ammonia gas as it is released into the soil typically causes freezing in various conditions of temperature and humidity, and the freezing can have an adverse effect on performance. For example, moisture can become frozen in the gas discharge opening and reduce, or even interrupt, the delivery of ammonia into the soil. Soil and moisture can also freeze on the tine 13 and even on the soil-cutting device, especially when it is a non-rotating device such as a knife or shank. Forming the discharge nozzle and the delivery tube of polymeric material having low thermal conductivity thermally isolates the gas discharge area from the metallic portions of the implement, thereby preventing or at least reducing the freezing of soil and moisture on those metallic portions. For example, the ammonia gas delivery tube may be a polymeric hose, and the discharge nozzle 16 may be formed as a molded plastic clamshell attached to the trailing end of the tine 13 by multiple screws 18.

It will be understood that the ammonia is supplied to the delivery tube 12 from a pressurized tank carried by the implement. If desired, the ammonia from the tank can be fed to a pump that increases the pressure of the ammonia in the delivery tube so that a substantial portion of the ammonia is maintained in liquid form.

It can be seen that the discharge nozzle in the illustrative embodiment is positioned to release the ammonia gas directly below a portion of the closing wheel. This minimizes the tendency of the ammonia to escape as gas in the area between the point where the gas is released from the discharge nozzle and the point where the furrow is closed by the closing wheel 11.

The plastic discharge nozzle 16 is shaped to form a seal against the bottom and/or the sides of the furrow formed by the opener disk 10 (see FIG. 1). The expansion chamber 17 diffuses the ammonia gas so that the gas is exposed to a greater surface area of soil without being allowed to be exposed to the atmosphere. Each unit of soil has a limited capacity to bind with ammonia, and thus increasing the area of soil that can bind with the ammonia, while limiting the ability of the ammonia to escape as gas to the atmosphere, generally improves the performance of the ammonia delivery device.

The implement described above may be used for cultivating and fertilizing a field to be planted later, or in conjunction with a planting implement that has a seed hopper and seed delivery device for depositing seed in the furrow between the cutting device and the closing device.

Figure 6:
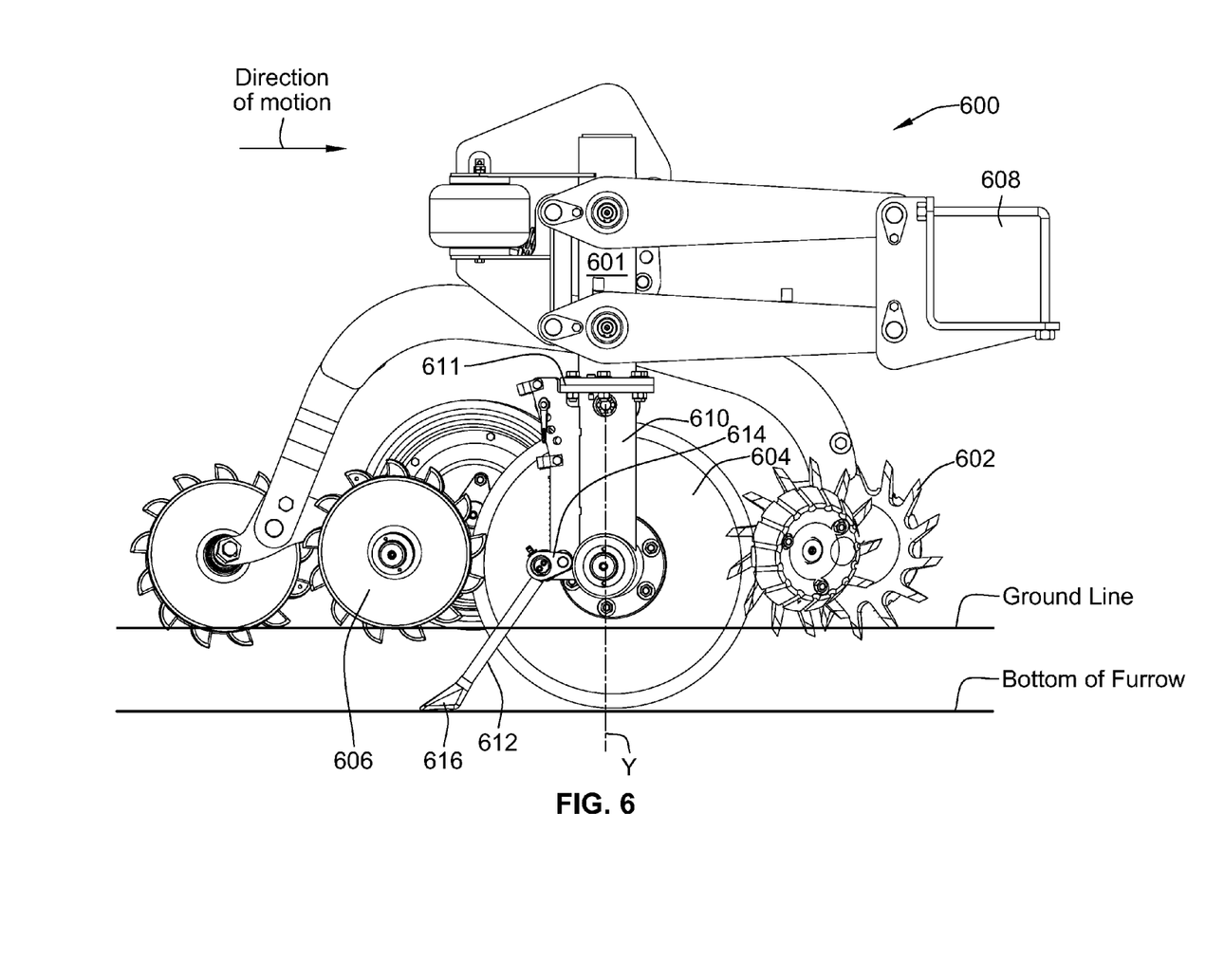
FIG. 6 is a side elevation of an agricultural planting implement that includes an injection tine assembly.
Figure 7:
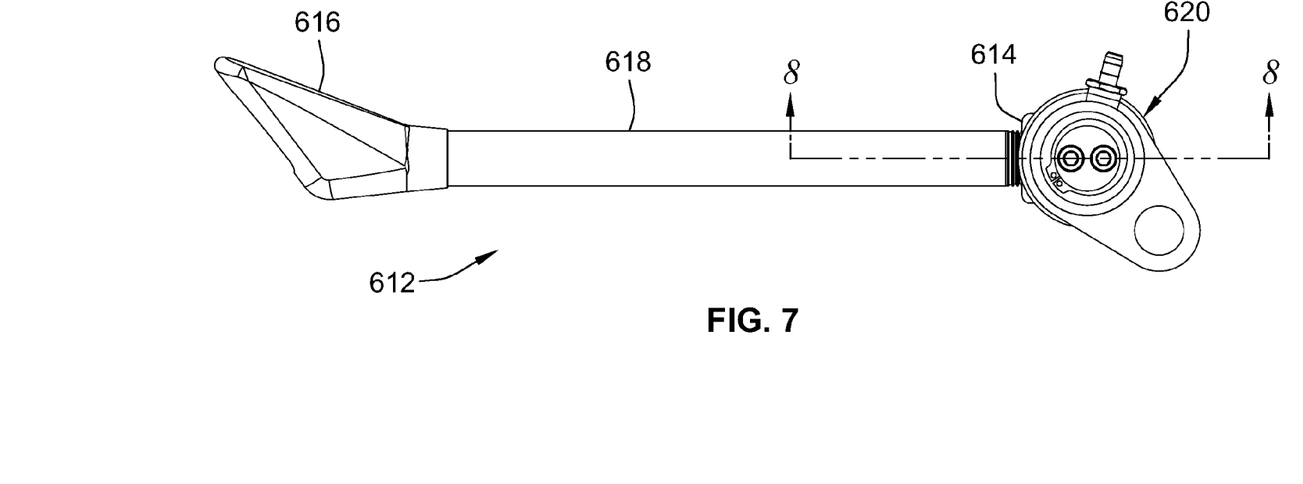
FIG. 7 is a side elevation of the tine assembly shown in FIG. 6.

Referring to FIG. 6, a furrow opener assembly 600 includes advantageous features directed to an angular adjustment for an opener disc and to a coaxial tine for an injection tine assembly. The furrow opener assembly 600 includes a main frame 601 to which a plurality of residue clearing wheels 602, an opener disc 604, and a plurality of closing wheels 606 are attached. The furrow opener assembly 600 is attachable to a towing vehicle, such as a tractor, via a frame attachment 608. The opener disc 604 is mounted to the main frame 601 via a depending arm 610, which is positioned in a generally vertical position and has an angular adjustment axis of rotation Y.

The depending arm 610 can be adjusted around the axis of rotation Y at an arm mount 611 such that the angle of the opener disc 604 can be changed. The angular change of the opener disc 604 causes a specific furrow width to be created. In other words, if the opener disc 604 is oriented generally parallel to the length of the furrow, the width of the furrow will be smaller, and if the opener disc 604 is oriented generally towards a perpendicular orientation relative to the length of the furrow, the width of the furrow will be larger.

The closing wheels 606 are mounted to the main frame 601 at a point above the arm mount 611 to provide a fixed position for the closing wheels 606 relative to the direction of motion of the tractor. The residue clearing wheels 602 are similarly mounted to the main frame 601 at a point above the arm mount 611. Thus, adjustment of the depending arm 610 does not affect the position of the closing wheels 606 or the residue clearing wheels 602.

The furrow opener assembly 600 further includes an injection tine assembly 612, which is coupled to the depending arm 610 at a pivoting end 614. Another end of the injection tine assembly 612 includes a diffuser (also referred to as a discharge nozzle) 616 that is generally biased toward the bottom of the furrow. The diffuser 616 is a general fluid discharge point that is placed in the furrow opened by the opener disc 604.

Referring to FIGS. 7-11, the injection tine assembly 612 includes a rod (or tine) 618 to which the diffuser 616 is connected at a bottom end, and to which a pivoting assembly 620 is connected at the pivoting end 614. The pivoting assembly 620 includes a pivoting shaft 622 and a fluid inlet housing 624, which includes a plurality of fluid inlet ports 626a, 626b.

Figure 8:
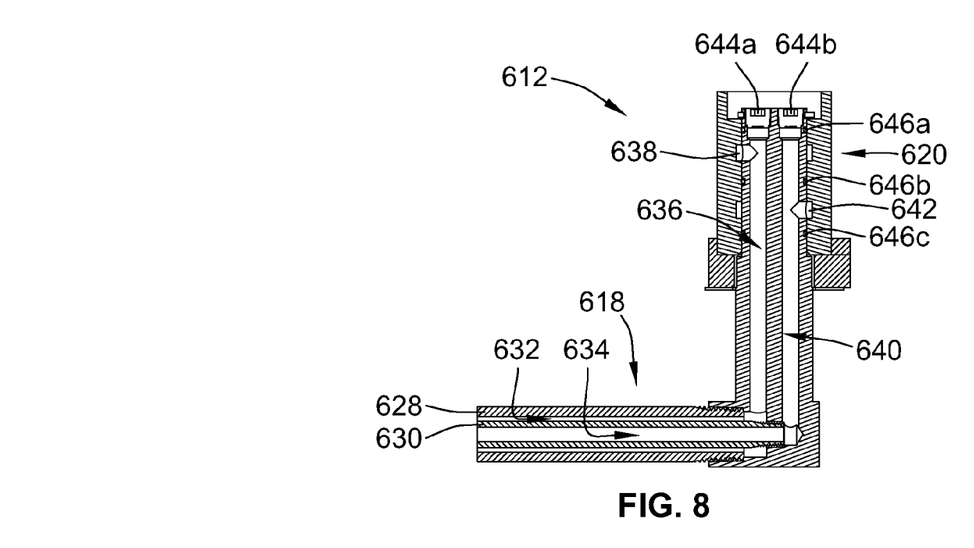
FIG. 8 is a partial cross-sectional view of the injection tine assembly shown in FIG. 7.
Figure 9:
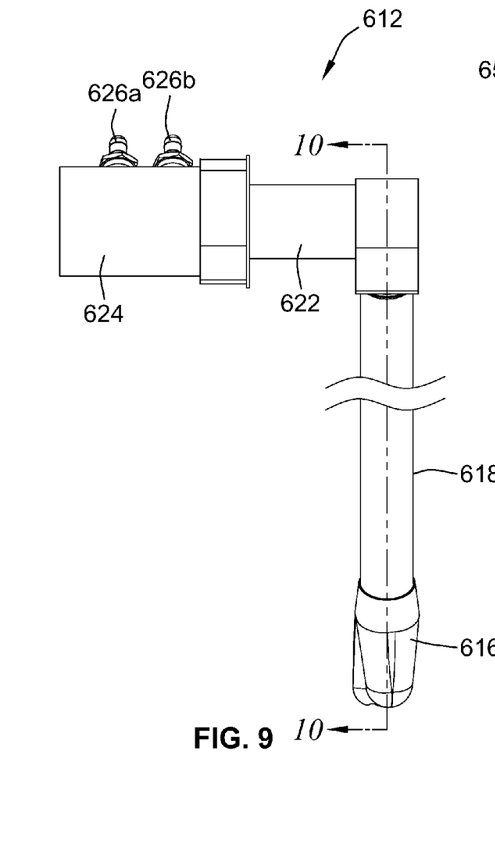
FIG. 9 is a front plan view of the tine assembly shown in FIG. 6.

As more clearly illustrated in FIG. 8, the rod 618 includes a plurality of coaxial tubes for forming passageways through which respective fluids flows toward the diffuser 616. Specifically, the coaxial tubes include an outer tube 628 and an inner tube 630. The outer tube 628 provide the primary structural support for the rod 618 and, typically, is formed from stainless steel material to provide good abrasion resistance to the soil and to resist highly corrosive agricultural products. A first fluid can flow through an outer passageway 632 that is formed between the outer tube 628 and the inner tube 630. A second fluid can flow, simultaneously with the first fluid, through an internal passageway 634 surrounded by the inner tube 630.

Referring to the pivoting assembly 620 and the fluid inlet housing 624 in more detail, the first fluid is inserted via a first tube 636 at a first insertion point 638, and the second fluid is inserted via a second tube 640 at a second insertion point 642. The first tube 636 and the second tube 640 of the pivoting assembly 620 are positioned parallel to each other in adjacent positions. A pair of plugs 644a, 644b prevent fluid flow in a direction away from the diffuser. A plurality of O-rings 646a, 646b, 646c are mounted to prevent fluid leaks near the fluid insertion points 638, 642. Delivering the fluids, which may generally include hazardous and caustic liquids, through the pivoting assembly 620 removes the need for having loose tubes near a dangerous blade area where crop residue tends to remain lodged. Accordingly, the pivoting assembly 620 provides a robust enclosure for chemical hose routings (e.g., the first tube 636 and the second tube 640) with increased safety and performance features.

For example purposes, it is assumed that the first fluid is water and the second fluid is ammonia gas. According to the embodiment described above, water enters the pivoting assembly 620 at the first insertion point 638, flows through the first tube 636, and continues flowing through the outer passageway 632 of the rod 618 toward the diffuser 616. Similarly, ammonia liquid enters the pivoting assembly 620 at the second insertion point 642, flows through the second tube 640, and continues flowing through the internal passageway 634 toward the diffuser 616. Before reaching a mixing chamber of the diffuser 616, the two fluids remain unmixed and at near-ambient temperature.

Figure 10:
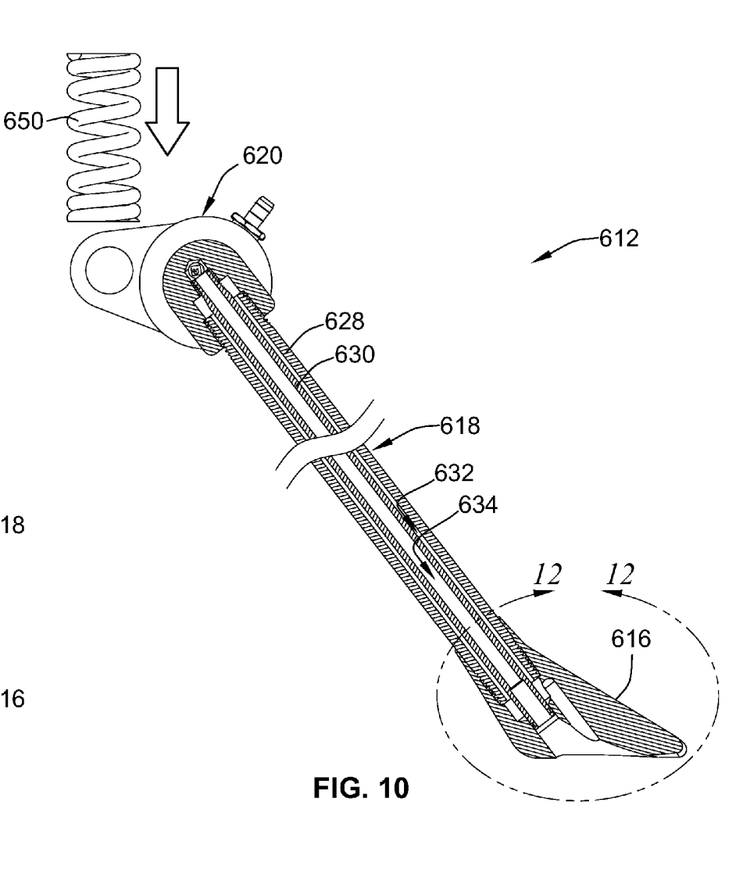
FIG. 10 is a cross-sectional view of the injection tine assembly shown in FIG. 9, including a diffuser.
Figure 11:
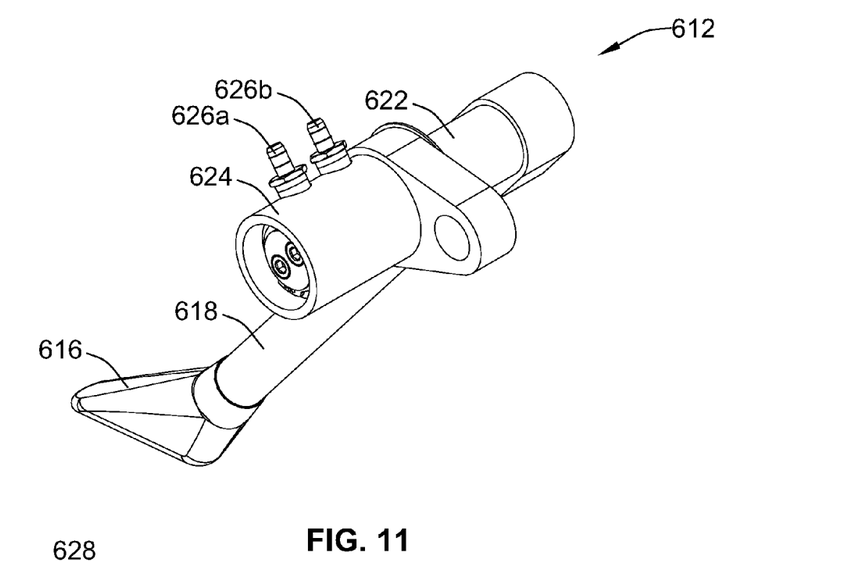
FIG. 11 is a perspective view of the injection tine assembly shown in FIG. 6.

Referring more specifically to FIG. 10, the pivoting assembly 620 is biased in a downward position (toward the furrow) by a spring 650, which acts in an opposite direction to the arrow shown in FIG. 10. The force of the spring helps maintain the diffuser 616 near the bottom of the furrow with the ability to flex upwardly as required by the soil conditions. For example, the pivoting assembly 620 allows the diffuser 616 to flex over rocks and obstructions. Optionally, in accordance with environmental conditions, the spring pressure is adjustable to provide a desired force.

Figure 12:
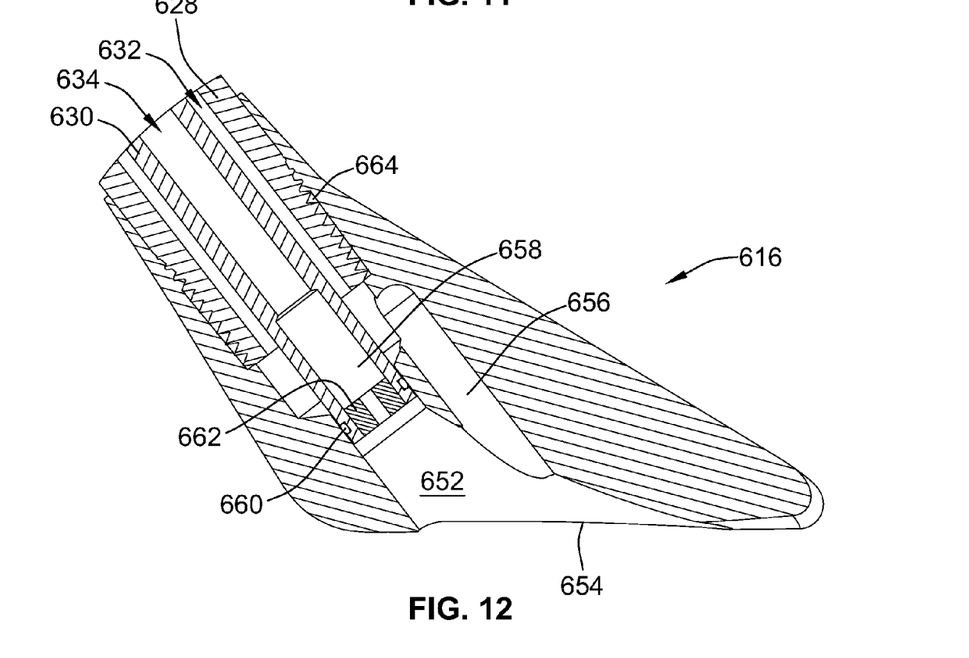
FIG. 12 is an enlarged cross-sectional view of the diffuser shown in FIG. 10.

Referring now to FIG. 12, the diffuser 616 has a generally rounded molded shape that prevents soil and/or plant residue from attaching to the rod 618 and, therefore, from interfering with the movement of the rod 618 through the furrow. The diffuser 616 includes a mixing chamber 652 and an exit opening 654. The first fluid enters the mixing chamber 652 via a first inlet opening 656 and the second fluid enters the mixing chamber 652 via a second inlet opening 658. A diffuser O-ring 660 seal prevents mixing of the two fluids before reaching the mixing chamber 652. Optionally, a removable plug 662 can be inserted in the second inlet opening 658 to temporarily prevent fluid flow from the internal passageway 634 into the mixing chamber 652.

When the fluids reach the mixing chamber 652, they mix to produce the desired chemical reaction. Because the mixing occurs in the expansion chamber 652, which is next to the bottom of the furrow, a more efficient chemical reaction is achieved, wherein none or minimal fluid loss occurs. For example, it is often advantageous to achieve mixing of anhydrous ammonia with a water-based liquid product because the mixture alters the ammonia rapidly into a form that will not escape as easily as a gas. The mixing chamber 652, which is only open toward the exterior environment on the bottom of the diffuser 616, at the exit opening 654, confines the chemical reaction to bias the byproduct of such a reaction toward the soil. Accordingly, the byproduct fertilizer is applied to the soil more efficiently by binding a higher quantity of fertilizer to the soil and minimizing loss to the air (wherein ammonia is lighter than air).

According to one embodiment, the diffuser 616 includes a plurality of threads 664 that are intended to engage mating threads on the rod 618 when connecting the diffuser 616 to the rod 618. The threads 665 of the diffuser 616 are optionally integratedly formed with the body of the diffuser 616. According to alternative embodiments, other fastening devices (such as adhesives) can be used to connect the diffuser 616 and the rod 618.

The diffuser 616 may be formed as a molded plastic casing using a compression molding process. The plastic material can be, for example, a UHMW (Ultra High Molecular Weight Polyethylene) material that is well suited for forming complex surface geometries. Another advantages of the UHMW material is that it provides high wear resistance.

In addition to manufacturing advantages, the UHMW material is further desirable because it insulates the fluids from thermal transfer. For example, the diffuser 616 functions as an insulator and, also, maintains separation between the outer tube 628 and the inner tube 630. For example, if ammonia gas is supplied in the internal passageway 634, the diffuser 616 inhibits freezing of the discharge point of the ammonia gas in the mixing chamber 652. Additionally, the freezing of the ammonia gas (or any other internal fluid) along the rod 618 is further inhibited by the fluid being supplied in the outer passageway 632 (e.g., water), which functions as an additional layer of insulation. Based at least on these two insulating features of the injection tine assembly 612, current needs for typical "heat exchanger" expansion chambers (which are required for cooling and maintaining ammonia gas in a liquid state so that it can be metered accurately) is minimized.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural implement for delivering multiple fluids to the soil of an agricultural field, the agricultural implement comprising:

a frame carrying a soil cutting device for forming a furrow in the soil and a closing device trailing the cutting device for closing the furrow; and a fluid delivery tine mounted on the frame and extending downwardly into the furrow between the cutting device and the closing device, the fluid delivery tine having a pair of coaxial tubes including an outer tube and an inner tube, the coaxial tubes forming an outer passageway between the outer tube and the inner tube for delivering a first fluid toward the furrow, the inner tube further having an internal passageway for delivering a second fluid toward the furrow, the fluid delivery tine further including a mixing chamber in which the first fluid and the second fluid are mixed prior to being applied to the furrow.

2. The agricultural implement of claim 1, further including a discharge nozzle coupled to a trailing end of the fluid delivery tine for discharging fluids onto at least the bottom of the furrow.

3. The agricultural implement of claim 2, wherein the discharge nozzle is made of non-metallic material.

4. The agricultural implement of claim 3, wherein the non-metallic material is an Ultra High Molecular Weight Polyethylene (UHMW) material.

5. The agricultural implement of claim 4, wherein the discharge nozzle is made using a compression molding process.

6. The agricultural implement of claim 2, wherein the discharge nozzle includes the mixing chamber in which the first fluid and the second fluid mix to achieve a resulting byproduct.

7. The agricultural implement of claim 6, wherein the discharge nozzle includes a bottom area, positioned closest to the bottom of the furrow, having an exit opening through which the byproduct is applied to the furrow.

8. The agricultural implement of claim 2, wherein the discharge nozzle includes integrated threads that are mounted to receiving threads on the fluid delivery tine.

9. The agricultural implement of claim 2, wherein the discharge nozzle has a generally rounded shape.

10. The agricultural implement of claim 1, wherein the mixing chamber has two apertures, a first one of the apertures corresponding to the internal passageway of the inner tube for receiving the second fluid into the mixing chamber, a second one of the apertures corresponding to the outer passageway for receiving the first fluid into the mixing chamber.

11. The agricultural implement of claim 10, wherein the discharge nozzle further includes an O-ring seal near the first one of the apertures to prevent mixing of the first fluid and the second fluid before reaching the mixing chamber.

12. The agricultural implement of claim 1, wherein the outer tube is a structural member made from a stainless steel material.

13. The agricultural implement of claim 1, wherein the fluid delivery tine is mounted to the frame via a pivoting assembly, the pivoting assembly being biased downwardly, toward the furrow, via a spring.

14. The agricultural implement of claim 1, further comprising a fluid inlet housing attached to the fluid delivery tine, the fluid inlet housing enclosing a pair of generally parallel tubes, a first one of the tubes being coupled to the outer tube for directing the first fluid from a first insertion point to the outer passageway, a second one of the tubes being coupled to the inner tube for delivering the second fluid from a second insertion point to the internal passageway.

15. The method of claim 1, further comprising routing a pair of parallel tubes in a fluid inlet housing that is attached to the fluid delivery tine, the parallel tubes delivering the fluids, in separate manner, to respective ones of the outer passageway and the internal passageway.

16. The method of claim 1, further comprising attaching the discharge nozzle to the fluid delivery tine such that a portion of the discharge nozzle forms an insulating barrier between two coaxial tubes of the fluid delivery tine.

17. A method of delivering multiple fluids to the soil of an agricultural field, the method comprising:
   forming a furrow in the soil with a towed cutting device;
   closing the furrow with a towed closing device trailing the cutting device;
   extending a fluid delivery tine downwardly into the furrow between the cutting device and the closing device, the fluid delivery tine having a bottom end coupled to a discharge nozzle;
   delivering, via the fluid delivery tine, two separate fluids into a mixing chamber of the discharge nozzle, a first one of the fluids being delivered via an outer passageway of the fluid delivery tine, and a second one of the fluids being delivered via an internal passageway of the fluid delivery tine, the internal passageway being coaxial with the outer passageway;
   mixing the two fluids in the mixing chamber to form a byproduct; and
   expelling the byproduct toward a bottom wall of the furrow prior to the closing of the furrow.

18. The method of claim 17, further comprising forming the discharge nozzle via a compression molding process from an Ultra High Molecular Weight Polyethylene (UHMW) material.

19. The method of claim 17, further comprising molding a plurality of integrated threads into the discharge nozzle for mounting the discharge nozzle to the fluid delivery tine.

20. The method of claim 17, further comprising biasing the fluid delivery tine toward the furrow using a spring.

* * * * *